US012767607B2

(12) United States Patent
Yuki et al.

(10) Patent No.: US 12,767,607 B2
(45) Date of Patent: Oct. 20, 2026

(54) COPPER-CERAMIC BONDED SUBSTRATE AND METHOD FOR MANUFACTURING THE SAME

(71) Applicant: DOWA METALTECH CO., LTD., Tokyo (JP)

(72) Inventors: Seiya Yuki, Tokyo (JP); Yuki Teramoto, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 34 days.

(21) Appl. No.: 18/842,569

(22) PCT Filed: Nov. 21, 2022

(86) PCT No.: PCT/JP2022/043042
§ 371 (c)(1),
(2) Date: Aug. 29, 2024

(87) PCT Pub. No.: WO2023/176045
PCT Pub. Date: Sep. 21, 2023

(65) Prior Publication Data

US 2025/0171369 A1 May 29, 2025

(30) Foreign Application Priority Data

Mar. 14, 2022 (JP) ................................ 2022-039743

(51) Int. Cl.
*B32B 9/04* (2006.01)
*C04B 37/02* (2006.01)
*C22C 9/00* (2006.01)

(52) U.S. Cl.
CPC ............ *C04B 37/026* (2013.01); *B32B 9/041* (2013.01); *C22C 9/00* (2013.01); *B32B 2250/02* (2013.01);
(Continued)

(58) Field of Classification Search
CPC ................................ B32B 9/041; C22C 9/00
(Continued)

(56) References Cited

U.S. PATENT DOCUMENTS 6,054,762 A 4/2000 Sakuraba et al.
2016/0083826 A1 3/2016 Monzen et al.
(Continued)

FOREIGN PATENT DOCUMENTS

EP 4 079 712 A1 10/2022
JP 63-231802 A 9/1988
(Continued)

OTHER PUBLICATIONS

Koizumi et all., "Permanent Strength of Metals: a Case Study on FCC Metals Processed by Severe Plastic Deformation", Spring Nature Link, Apr. 1, 2022, URL: < https://link.springer.com/article/10.1007/s11661-022-06641-1#Bib1>, pp. 2004-2017 (Year: 2022).*
(Continued)

*Primary Examiner* — Katherine A Christy
(74) *Attorney, Agent, or Firm* — Greenblum & Bernstein, P.L.C.

(57) ABSTRACT

A copper-ceramic bonded substrate, including: a ceramic substrate; and a copper sheet bonded to at least one surface of the ceramic substrate, where a dislocation density of the copper sheet is 1.5×1013 m-2 or less. And, methods for manufacturing a copper-ceramic bonded substrate, the methods including: placing a copper sheet having an arsenic content of 0.005 ppm to 1.5 ppm and an antimony content of 0.005 ppm to 0.5 ppm on at least one surface of a ceramic substrate; and heating and bonding them together, where a dislocation density after bonding of the copper sheet is $1.5\times10^{13}$ $m^{-2}$ or less.

9 Claims, 2 Drawing Sheets

(52) U.S. Cl.
CPC ....... *B32B 2307/72* (2013.01); *B32B 2311/12* (2013.01); *B32B 2315/02* (2013.01)

(58) Field of Classification Search
USPC .......................................................... 428/621
See application file for complete search history.

(56) References Cited

U.S. PATENT DOCUMENTS

| | | | |
|---|---|---|---|
| 2022/0025486 | A1 | 1/2022 | Ito et al. |
| 2023/0068210 | A1 | 3/2023 | Ozaki |
| 2023/0112081 | A1 | 4/2023 | Matsunaga et al. |
| 2023/0243018 | A1 | 8/2023 | Matsunaga et al. |

FOREIGN PATENT DOCUMENTS

| | | | |
|---|---|---|---|
| JP | 8-97554 | A | 4/1996 |
| JP | 10-125821 | A | 5/1998 |
| JP | 2012-114203 | A | 6/2012 |
| JP | 2012-136378 | A | 7/2012 |
| JP | 2022-22637 | A | 2/2022 |
| WO | 2014/196563 | A1 | 12/2014 |
| WO | 2020/122112 | A1 | 6/2020 |
| WO | 2021/177469 | A1 | 9/2021 |
| WO | 2021/200242 | A1 | 10/2021 |
| WO | 2021/200866 | A1 | 10/2021 |
| WO | 2022/004791 | A1 | 1/2022 |

OTHER PUBLICATIONS

Kumagai et al., Evaluation of plastic deformation due to mechanical loading using X-ray diffraction profile analysis; Current advances in materials and processes: Report of the ISIJ meeting. The Iron and Steel Institute of Japan; pp. 171-174; vol. 25; 2012; Concise Statement of relevance may be found in the ISR and Written Opinion (submitted herewith).

Tsuji, Dislocation density (Mechanical properties of materials (Basics, Dislocation theory, Strengthening mechanism). Fundamental creation engineering); 2008; pp. 1-38; Concise Statement of relevance may be found in the ISR and Written Opinion (submitted herewith).

International Search Report (ISR) and Written Opinion of the International Searching Authority that issued in International Patent Application No. PCT/JP2022/043042, dated Jan. 17, 2023, along with an English translation thereof.

Extended European Search Report, dated May 28, 2026, that issued in corresponding European Application No. 22932308.4.

* cited by examiner

COPPER-CERAMIC BONDED SUBSTRATE AND METHOD FOR MANUFACTURING THE SAME

TECHNICAL FIELD

The present invention relates to a copper-ceramic bonded substrate and a method for manufacturing the same.

DESCRIPTION OF RELATED ART

Power modules are used to control large amounts of power in electric vehicles, trains, machine tools, etc., and as an electric circuit board for such a power module, a metal-ceramic bonded substrate in which a metal circuit board such as Cu or Al is bonded to the surface of a ceramic plate is used. This metal-ceramic bonded substrate has a ceramic substrate having a circuit pattern metal sheet formed on one surface thereof, and a heat dissipating metal sheet formed on the other surface thereof.

As a method for manufacturing such a metal-ceramic bonded substrate, there is a method in which a brazing material made of a mixture of active metal, Ag, and Cu (Ag—Cu active metal brazing) material is interposed between a metal sheet and a ceramic plate by heat treatment (active metal brazing method) (see, for example, Patent Document 1).

Metal-ceramic bonded substrates for power modules are subjected to repeated heat loads during the assembly process of the power module and in the environment in which the power module is actually used.

For example, in a power module assembly process, a power semiconductor element is mounted on a circuit pattern metal sheet by a bonding method such as a solder bonding method or a fine particle metal sintering method, and a base plate composed of Cu, Al, an Al—SiC composite material, etc., is bonded to the heat dissipating metal sheet by a similar bonding method. In this case, since the substrate is heated by passing through, for example, a tunnel (continuous) furnace, a bonded substrate is subjected to a heat load due to such a furnace passing process.

Further for example, in an actual use of a power module, power semiconductor elements generate heat during a switching operation, and are cooled when the power module stops operating, and therefore the power module is subjected to heat load due to heat cycles.

For example, Cu or Al is used for the circuit board of the metal-ceramic bonded substrate. When using aluminum, heat loads such as furnace processing and heat cycles are applied, and a thermal stress caused by a difference in thermal expansion between the ceramic substrate and the metal circuit board can be alleviated by a plastic deformation of the aluminum, but an Al metal circuit board is inferior to a Cu metal circuit board in terms of electrical conductivity and heat dissipation. On the other hand, when Cu is used as the metal circuit board, there is a problem that the reliability is inferior when a heat load is applied compared to when Al is used.

Therefore, the copper-ceramic bonded substrate is required to have good heat cycle properties that prevent the ceramic substrate from being damaged even when subjected to such a heat load.

As a method for alleviating the thermal stress in ceramic caused by heat load, a method of providing a stepped shape in a cross-sectional shape of a metal sheet bonded to a ceramic (see, for example, Patent Document 2), and a method of forming dimples on an outer periphery of a metal sheet bonded to a ceramic (for example, see Patent Document 3), are proposed.

PRIOR ART DOCUMENT

Patent Document

[Patent Document 1] JP 8-97554 A
[Patent Document 2] JP 10-125821 A
[Patent Document 3] JP 2012-114203 A

SUMMARY OF THE INVENTION

Problem to be Solved by the Invention

However, in the methods disclosed in Patent Documents 2 and 3, a mounting area for electronic components mounted on the surface of the metal sheet is reduced, which makes it necessary to increase an external size (area) of the copper-ceramic bonded substrate, resulting in an increase in the size of the power module.

Therefore, an object of the present invention is to provide a technique for realizing good heat cycle properties without changing an outer size of a copper-ceramic bonded substrate.

Means for Solving the Problem

According to a first aspect of the present invention, there is provided a copper-ceramic bonded substrate, including:

a ceramic substrate; and a copper sheet bonded to at least one surface of the ceramic substrate, wherein a dislocation density of the copper sheet is $1.5\times10^{13}$ $m^{-2}$ or less.

According to a second aspect of the present invention, there is provided the copper-ceramic bonded substrate of the first aspect, wherein the copper sheet has an arsenic content of 0.005 ppm to 1.5 ppm and an antimony content of 0.005 ppm to 0.5 ppm.

According to a third aspect of the present invention, there is provided the copper-ceramic bonded substrate of the first or second aspect, wherein the copper sheet has a sulfur content of 0.1 ppm to 7 ppm and a phosphorus content of 0.05 to 2 ppm.

According to a fourth aspect of the present invention, there is provided the copper-ceramic bonded substrate of any one of the first to third aspects, wherein a zinc content in the copper sheet is 0.005 ppm to 0.08 ppm.

According to a fifth aspect of the present invention, there is provided the copper-ceramic bonded substrate of any one of the first to fourth aspects, wherein a silver content in the copper sheet is 0.1 ppm to 20 ppm.

According to a sixth aspect of the present invention, there is provided the copper-ceramic bonded substrate of any one of the first to fifth aspects, wherein a total amount of impurity elements in the copper sheet, excluding sulfur, phosphorus, arsenic, antimony, zinc and silver, is 0.01 ppm to 15 ppm.

According to a seventh aspect of the present invention, there is provided the copper-ceramic bonded substrate of any one of the first to sixth aspects, wherein a material of the copper sheet is an oxygen-free copper or a tough pitch copper.

According to an eighth aspect of the present invention, there is provided the copper-ceramic bonded substrate of any one of the first to seventh aspects, wherein a brazing bonded layer is provided between the ceramic substrate and the copper sheet, and the copper sheet is bonded to the ceramic substrate interposing the brazing bonded layer.

According to a ninth aspect of the present invention, there is provided a method for manufacturing a copper-ceramic bonded substrate, including:

placing a copper sheet having an arsenic content of 0.005 ppm to 1.5 ppm and an antimony content of 0.005 ppm to 0.5 ppm on at least one surface of a ceramic substrate; and heating and bonding them together, wherein a dislocation density after bonding of the copper sheet is $1.5\times10^{13}$ $m^{-2}$ or less.

According to a tenth aspect of the present invention, there is provided the method of the ninth aspect, wherein in the bonding, the copper sheet is placed on the ceramic substrate, and the ceramic substrate and the copper sheet are heated while being temporarily pressed against each other.

According to an eleventh aspect of the present invention, there is provided the method of the ninth or tenth aspect, wherein the copper sheet has a sulfur content of 0.1 ppm to 7 ppm and a phosphorus content of 0.05 to 2 ppm.

According to a twelfth aspect of the present invention, there is provided the method of any one of the ninth to eleventh aspects, wherein a zinc content in the copper sheet is 0.005 ppm to 0.08 ppm.

According to a thirteenth aspect of the present invention, there is provided the method of any one of the ninth to twelfth aspects, wherein a silver content in the copper sheet is 0.1 ppm to 20 ppm.

According to a fourteenth aspect of the present invention, there is provided the method of any one of the ninth to thirteenth aspects, wherein a total amount of impurity elements, excluding sulfur, phosphorus, arsenic, antimony, zinc and silver, in the copper sheet is 0.01 to 15 ppm.

According to a fifteenth aspect of the present invention, there is provided the method of any one of the ninth to fourteenth aspects, wherein a material of the copper sheet is oxygen-free copper or tough pitch copper.

According to a sixteenth aspect of the present invention, there is provided the method of any one of the ninth to fifteenth aspects, wherein the copper sheet is placed on the ceramic substrate interposing a brazing material, and then heated to bond them together.

According to a seventeenth aspect of the present invention, there is provided the method of any one of the ninth to sixteenth aspects, wherein in the bonding, heating is performed by maintaining a temperature in a range of 500° C. or higher for 6 hours or more.

According to an eighteenth aspect of the present invention, there is provided the method of any one of the ninth to seventeenth aspects, wherein in the bonding, heating is performed by maintaining the temperature in a range of 700° C. or higher for 2 hours or more.

According to a nineteenth aspect of the present invention, there is provided the method of any one of the ninth to eighteenth aspects, wherein a load pressure of the temporary press in the bonding is 0.5 kPa to 5 kPa.

Advantage of the Invention

According to the present invention, in a copper-ceramic bonded substrate, good heat cycle properties can be achieved without changing an outer size.

DETAILED DESCRIPTION OF THE INVENTION

Finding Obtained by the Present Inventors

Figure 1:
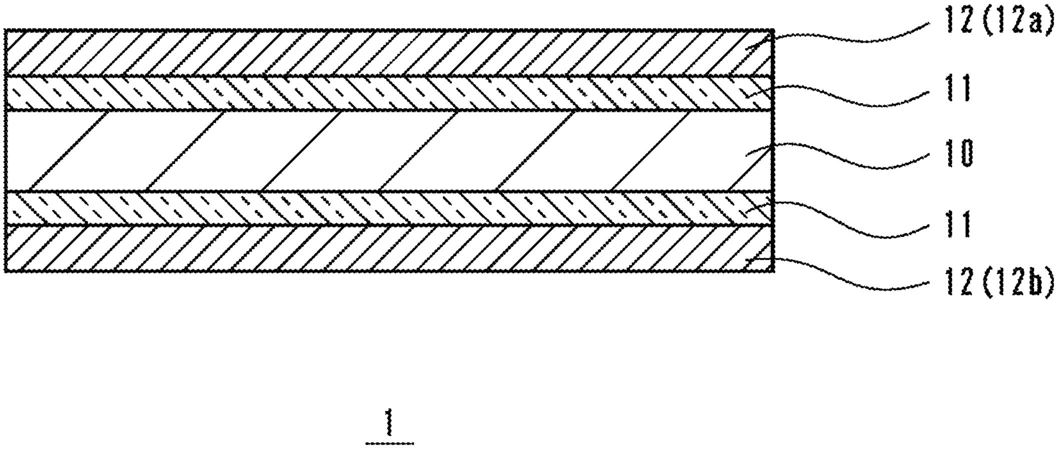
FIG. 1 is a cross-sectional view that illustrates an example of a copper-ceramic bonded substrate according to one embodiment of the present invention.

First, the finding obtained by the present inventors will be described.

A copper sheet used in a copper-ceramic bonded substrate (hereinafter also simply referred to as a bonded substrate) is generally composed of a plate material of pure copper with a copper purity of 99.9 mass % or more, such as oxygen-free copper (C1020) or tough pitch copper (C1100). However, it was found that even if the copper sheet of the same specification (same type of pure copper, same quality) was used, the heat cycle properties of a final copper-ceramic bonded substrate were different.

After examining and investigating this point, it can be considered as follows: regarding the copper sheet, an amount of trace impurity elements contained in a cast copper cake before rolling, and manufacturing conditions such as rolling conditions and heat treatment conditions vary depending on a copper roll manufacturer. Therefore, an accumulated strain (accumulation of dislocations) in the copper sheet was measured. Then, it was found that the dislocation density of the copper sheet in the copper-ceramic bonded substrate varies depending on the manufacturer and manufacturing conditions such as casting and processing of the copper cake. When the copper sheet is bonded to the ceramic substrate, it is annealed by being held at a temperature equal to or higher than a softening temperature of copper (for example, 200° C.), so the dislocations accumulated in the copper sheet are reduced. However, the amount of trace impurities that affect a dislocation accumulation state of the copper sheet before bonding and the annealing process, differs depending on the manufacturer and the manufacturing conditions of the copper cake, and the states of recovery, recrystallization, and grain growth of copper crystals during the bonding of the bonded substrate also differ, and this is presumably related to the heat cycle properties of the final bonded substrate.

Therefore, the present inventors quantitatively evaluated the accumulation state of strain in the copper sheet by the dislocation density using the modified Williamson-Hall/Warren-Averbach method, and further perform investigation into a relationship between the dislocation density, the amount of impurity elements in the copper sheet, and the heat cycle properties of the bonded substrate.

As a result, it was found that by adjusting the dislocation density of the copper sheet in the copper-ceramic bonded substrate to a specified value or less, high heat cycle properties can be obtained. It was also found that by controlling the content of specific impurity elements in the copper sheet within a certain range, the dislocation density of the copper sheet in the bonded substrate can be controlled to be small.

Further, as a method for manufacturing such a copper-ceramic bonded substrate, there is provided a method for manufacturing a copper-ceramic bonded substrate that can control the dislocation density in the copper sheet of the bonded substrate to a small value, by placing the copper sheet on at least one surface of a ceramic substrate and heated, and then adjusting the dislocation density of the bonded copper sheet to a predetermined value or less, and further, by using a copper sheet with the content of specific impurities controlled within a certain range.

When the dislocation density of the copper sheet is large, it is considered that when the copper-ceramic bonded substrate is subjected to a heat cycle, dislocations that accumulate in the copper sheet inhibit a slip motion of copper crystals, making the copper sheet more susceptible to work hardening. Therefore, it is presumed that during the heat cycle, thermal stress applied to the ceramic substrate of the copper-ceramic bonded substrate increases, causing a decrease in a heat cycle resistance. In this regard, it is found that by controlling the content of impurity elements in the copper sheet so that the dislocation density in the copper sheet of the copper-ceramic bonded substrate falls within a predetermined range, high heat cycle properties in the bonded substrate is realized.

The present invention is made based on the above finding.

One Embodiment of the Present Invention

Hereinafter, preferable embodiments of a copper-ceramic bonded substrate according to the present invention will be described with reference to the drawings. FIG. 1 is a cross-sectional view that illustrates an example of a copper-ceramic bonded substrate according to one embodiment of the present invention. The present invention is not limited to these examples, but is defined by the claims, and is intended to include all modifications within the meaning and scope of the claims. Further, in this specification, a numerical range expressed using "to" means a range that includes the numerical values before and after "to", as lower and upper limits.

(1) Copper Ceramic Bonded Substrate

First, a copper-ceramic bonded substrate will be described. Here, an example will be described in which copper sheets are bonded to both sides of a ceramic substrate. In this specification, the term "copper-ceramic bonded substrate" refers to both a substrate before a circuit pattern is formed on a copper sheet, and a circuit board after a circuit pattern is formed on a copper sheet. Hereinafter, the "copper-ceramic bonded substrate" may be simply referred to as a "bonded substrate."

As shown in FIG. 1, a copper-ceramic bonded substrate 1 (bonded substrate 1) of the present embodiment is configured to include, for example, a ceramic substrate 10, a brazing bonded layer 11, and a copper sheet 12. The bonded substrate 1 is processed into a copper-ceramic circuit board (hereinafter also referred to as a circuit board) by forming a predetermined pattern on the copper sheet 12.

(Ceramic Substrate)

The ceramic substrate 10 serves to support and fix the copper sheet 12, and further serves to provide insulation between circuits and between front and back sides when used as a circuit board. As the ceramic substrate 10, for example, an oxide-based ceramic substrate containing alumina, etc., as a main component, or a non-oxide-based ceramic substrate containing aluminum nitride, silicon nitride, silicon carbide, etc., as a main component can be used. The size of the ceramic substrate 10 is preferably 5 mm to 200 mm in length, 5 mm to 200 mm in width, and 0.2 mm to 3.0 mm in thickness, and more preferably, a substantially rectangular substrate having a length of 10 mm to 100 mm, a width of 10 mm to 100 mm, and a thickness of 0.25 mm to 2.0 mm.

(Brazing Bonded Layer)

A brazing bonded layer 11 is provided on both sides of the ceramic substrate 10. The brazing bonded layer 11 is interposed between the ceramic substrate 10 and the copper sheet 12 to bond them together. The brazing bonded layer 11 is formed from a brazing material that contains, for example, silver or copper as a metal component and further contains an active metal component (active metal-containing brazing material). The brazing bonded layer 11 is a layer formed by reaction between the components of the ceramic substrate 10, the brazing material, and the copper sheet 12 in a bonding described below.

The thickness of the brazing bonded layer 11 is not particularly limited, but from the viewpoint of ensuring a thermal shock resistance and bondability of the circuit board produced from the bonded substrate 1, it is preferably 3 μm to 50 μm, and more preferably 5 to 20 μm.

A silver content in the brazing material is not particularly limited, but from the viewpoint of improving the reliability of the bonding strength of the brazing bonded layer 11, it is preferably, for example, 30 to 95 mass %, more preferably 50 to 90 mass %, and even more preferably 65 to 90 mass %. The silver content in the brazing material indicates a mass ratio to a total mass of metal components contained in the brazing material. Hereinafter, the contents of metal components other than silver are also expressed as a ratio to a total mass of the metal components contained in the brazing material.

An active metal component preferably contains at least one active metal selected from, for example, titanium or zirconium. The content of the active metal component in the brazing material is, for example, preferably 1.0 to 7.0 mass %, and more preferably 1.5 to 6.5 mass %. This makes it possible to improve and ensure the bonding between the ceramic substrate and the copper sheet. When the active metal-containing brazing material is a silver-copper type, (remainder of) the metal components other than the above-described silver and active metal components is a copper content.

The brazing material may further contain tin as a metal component from the viewpoint of reducing a bond defect and suppressing migration. The tin content is preferably, for example, 10 mass % or less based on a total amount of metal elements. Tin can improve the bond between the ceramic substrate and the copper sheet. That is, in the case of silver-copper based active metal-containing brazing material, for example, as described above, the brazing material preferably has a silver content of 30 to 95 mass %, an active metal content of 1.0 to 7.0 mass %, a tin content of 10 mass % or less (preferably 1 to 8 mass %), with a remainder being copper.

(Copper Sheet)

Copper sheets 12 are bonded to both sides of the ceramic substrate 10 interposing brazing bonded layers 11. The copper sheet 12 is a plate-shaped member composed of pure copper containing copper and impurity elements. Of the two copper sheets 12, a copper sheet 12*a* bonded to one surface is used to form a predetermined circuit pattern. A copper sheet 12*b* bonded to the other surface is to form a heat sink pattern for releasing heat generated from chip components such as semiconductor elements mounted on the circuit pattern.

From the viewpoint of improving thermal conductivity and achieving high heat dissipation, the copper sheet 12 has a copper (Cu) content of 99.9 mass % or more, and is preferably pure copper with a Cu content of 99.96 mass % or more. Further, the copper sheet 12 contains impurity elements such as silver (Ag), iron (Fe), zinc (Zn), phosphorus (P), sulfur(S), arsenic (As), and antimony (Sb).

(Impurity Elements in the Copper Sheet)

When an element is added to copper, it is generally considered that many of the elements increase the recrystallization temperature of copper and inhibit the recrystallization of copper when heated. Because the impurity elements contained in pure copper are in minute quantities, it is not necessarily possible to clearly detect an increase in the recrystallization temperature of copper. However, it is presumed that these impurity elements have an effect on the movement and disappearance of dislocations when heating is applied to bond the copper sheet and ceramic substrate.

In this regard, according to the investigations of the present inventors, S, P, As, Sb and Zn are considered to be elements that have a particularly large effect on the movement and disappearance of Cu dislocations. For example, S tends to be unevenly distributed in the crystal grain boundaries of Cu, and tends to hinder the movement and disappearance of dislocations when Cu is heated. In this regard, according to the study by the present inventors, it is preferable to control the S content in the copper sheet 12 to 0.1 ppm to 7 ppm, the P content to 0.05 ppm to 2 ppm, the As content to 0.005 ppm to 1.5 ppm, the Sb content to 0.005 ppm to 0.5 ppm, and the Zn content to 0.005 ppm to 0.08 ppm, and it is found that by controlling the contents of these elements, it is possible to suppress the impediment to the movement or disappearance of the Cu dislocations (or the increase in the recrystallization temperature). It is considered that the copper sheet 12 having such a composition can easily reduce dislocations that accumulate inside when heated, and can suppress work hardening due to heat cycles. That is, the heat cycle properties of the copper-ceramic bonded substrate 1 can be further improved. The percentage of impurities is expressed in "ppm by mass", but for convenience it is expressed as "ppm". Further, the impurity contents are values measured by glow discharge mass spectrometry (GDMS) as shown in the examples described later.

The content of each impurity element will be described below.

The S content is preferably 0.1 ppm to 7 ppm, and from the viewpoint of improving the heat cycle properties of the bonded substrate 1, it is more preferably 1 ppm to 6 ppm, and further preferably 4.5 ppm or less.

It is known that P, like S, is unevenly distributed in the grain boundaries of Cu and increases the recrystallization temperature, but according to the investigations of the present inventors, it is found that P contributes to suppressing an increase in the recrystallization temperature through its interaction with S. Therefore, in the presence of S, P may be contained, and the P content may be 0.05 ppm to 2 ppm, or may be 0.1 to 1.5 ppm.

The As content is preferably 0.005 ppm to 1.5 ppm, more preferably 0.05 ppm to 0.5 ppm, and may be 0.3 ppm or less.

The Sb content is preferably 0.01 ppm to 0.5 ppm, and more preferably 0.02 ppm to 0.2 ppm.

The Zn content is preferably 0.005 ppm to 0.08 ppm, and more preferably 0.01 ppm to 0.04 ppm.

The copper sheet 12 may contain Ag in addition to the above-described S, P, As, Sb, and Zn. It is considered that the effect of Ag on the movement or disappearance of Cu dislocations (or on the increase in recrystallization temperature) when the copper sheet is heated, can be neglected. Accordingly, the copper sheet 12 may contain 20 ppm or less of Ag, preferably 0.1 ppm to 15 ppm, more preferably 1 to 10 ppm.

The content of impurity elements other than those described above is not particularly limited, but a total content of impurity elements is preferably 0.01 ppm to 15 ppm, more preferably 0.1 ppm to 8 ppm, and most preferably 0.5 ppm to 6 ppm. Further, a total content of impurity elements may be 3 ppm or less.

The copper sheet 12 having the above-described composition bonded to the ceramic substrate is configured so that the dislocation density determined by the modified Williamson-Hall/Warren-Averbach method (hereinafter also referred to as the mWH/WA method) is $1.5\times10^{13}\ m^{-2}$ or less. Preferably, the dislocation density is $1.0\times10^{13}\ m^{-2}$ or less.

The smaller the dislocation density, the more preferable it is. There is no particular restriction in the lower limit of the dislocation density. For example, the lower limit may be $1.0\times10^{11}\ m^{-2}$ or $1.0\times10^{12}\ m^{-2}$.

The mWH/WA method is one kind of X-ray diffraction line profile method. The X-ray diffraction line profile method is a technique for quantitatively evaluating factors causing shape changes in an X-ray line profile (diffraction intensity curve), such as crystallite size, lattice strain, and dislocation density, by inverse analysis of a line profile shape. The mWH/WA method makes it possible to quantitatively evaluate the dislocation density with higher accuracy by taking into account an effect of an anisotropic lattice distortion dependent on crystal orientation by introducing a correction term called a contrast factor.

In the present embodiment, by controlling the content of specific impurity elements contained in the copper sheet 12 within a predetermined range, the copper sheet has fewer dislocations when heated, and the dislocation density of the copper sheet 12 bonded to the ceramic substrate 10, as determined by the mWH/WA method, is $1.5\times10^{13}\ m^{-2}$ or less.

Further, in the copper sheet 12, Cu is recrystallized by heating during bonding, so an average crystal grain size of Cu becomes larger than that before bonding. In the copper sheet 12 of the present embodiment, the contents of P, S, As, Sb, and Zn are controlled within a predetermined range, so that dislocations are easily reduced by heating, and this makes it possible to increase the average crystal grain size of Cu after heating. The average crystal grain size of Cu is not particularly limited, but from the viewpoint of further improving the heat cycle properties, it is preferably 0.05 to 0.5 mm, and more preferably 0.08 to 0.4 mm.

The two copper sheets 12 used in the bonded substrate 1 may have the same composition or different compositions, but from the viewpoint of production efficiency, it is preferable that they have the same composition.

(2) Method for Manufacturing a Copper-Ceramic Bonded Substrate

Next, a method for manufacturing the above-described bonded substrate 1 will be described.

(Preparation Step)

First, the ceramic substrate 10, a raw copper sheet, and a brazing material are prepared.

As a raw copper sheet, for example, an oxygen-free copper sheet can be used, and it is advisable to appropriately select one having P, S, As, Sb and Zn contents within the above-described ranges. The dislocation density of the raw copper sheet is not particularly limited, and is preferably within a range of $5.0\times10^{15}$ $m^{-2}$ or less, for example, and may be within a range of $1.0\times10^{14}$ $m^{-2}$ to $2.5\times10^{15}$ $m^{-2}$.

The active metal-containing brazing material may be in the form of a paste or foil. The paste-like brazing material can be produced by a known method of kneading a metal powder composed of a metal component with a vehicle containing a binder and a solvent. As described above, the brazing material contains, for example, silver and copper as metal components, and preferably contains at least one active metal selected from titanium or zirconium, and may contain at least one metal component selected from tin or indium.

(Brazing Layer Forming Step)

Next, a brazing material in a paste form, for example, is applied to both sides of the ceramic substrate 10. Then, the applied brazing material is dried in the air or in an inert atmosphere to form a brazing material layer. The brazing material can be applied by a conventional method such as screen printing, spraying, or using a roll coater. When the brazing material is a foil, the brazing material layer may be formed by placing the brazing material foil in contact with the surface of the ceramic substrate.

(Copper Sheet Bonding)

Next, a raw copper sheet is placed in contact with the brazing material layer, and a temporary pressure is applied to the raw copper sheet to prevent misalignment of the raw copper sheet, and then the stack is heated in a vacuum or a non-oxidizing atmosphere. Thereby, the brazing material layer melts and bonds the raw copper sheet and the ceramic substrate 10 to form a brazing bonded layer 11, and the raw copper sheet is bonded to the ceramic substrate 10 interposing the brazing bonded layer 11. During bonding, the raw copper sheets are annealed by heating, and Cu is recrystallized to reduce dislocations remaining inside, thereby forming the copper sheet 12 having a predetermined dislocation density. In the present embodiment, by setting the impurity elements contained in the copper sheet 12 to the above-described predetermined content, the dislocation density determined by the mWH/WA method can be set to $1.5\times10^{13}$ $m^{-2}$ or less.

The term "placing the raw copper sheet in contact with the brazing material layer" refers to stacking the ceramic substrate 10 and the raw copper sheet with the brazing material layer interposed therebetween. The term "temporarily pressurizing the raw copper sheet" refers to placing a weight on the raw copper sheet in this stack interposing a spacer such as a ceramic substrate, or applying pressure using a jig that clamps the stack, to prevent the raw copper sheet from misaligning, etc. The term "temporary pressing" refers to a low pressing load that can suppress the misalignment of the raw copper sheets and does not excessively increase the dislocation density of the copper sheet 12 obtained by bonding. When the pressure load during bonding is excessively high, the copper sheet 12 may be deformed by the bonding load during a cooling step after bonding, resulting in an increase in the dislocation density. Therefore, from the viewpoint of keeping the dislocation density of the copper sheet 12 after bonding within the above range, it is preferable to apply temporary pressure with a low pressure load. Specifically, the pressure load is preferably 0.5 kPa to 5 kPa.

Regarding the heating conditions during bonding, a temperature profile may be appropriately adjusted so that the dislocation density in the copper sheets 12 after bonding, as determined by the mWH/WA method, is $1.5\times10^{13}$ $m^{-2}$ or less. That is, the time for which the temperature is held at or above a softening temperature of Cu (about 200° C.) may be appropriately adjusted so that the dislocation density falls within a predetermined range. From the viewpoint of shortening the heating time and improving the manufacturing efficiency, it is preferable to heat the stack so that the holding time in a temperature range of 500° C. or higher (at least twice the softening temperature of Cu) is 6 hours or longer, or it is more preferable to heat the stack so that the holding time in a temperature range of 700° C. or higher is 2 hours or longer. In the brazing method, the bonding temperature at which the brazing material melts and bonds the raw copper sheet and the ceramic substrate 10 is generally 750° C. or higher, preferably 770° C. or higher, and it is preferable to control the temperature profile so as to satisfy the above-described temperature range and holding time.

As described above, the bonded substrate 1 is obtained in which the copper sheet 12 is bonded to the surface of a ceramic substrate 10 interposing the brazing bonded layer 11.

(3) Copper-Ceramic Circuit Board and its Manufacturing Method

Next, a method for producing a circuit board from the above-described bonded substrate 1 will be described.

First, for example, a resist film for etching having a predetermined circuit pattern is formed on the surface of the copper sheet 12*a* of the bonded substrate 1. Further, a resist film for etching having a predetermined heat sink pattern is formed on the surface of the copper sheet 12*b*. These resist films may be formed on the surfaces of the copper sheets 12*a* and 12*b* by forming a resist by a known method such as screen printing, laminating, or photomasking, and then curing it.

Next, a known etching solution, such as cupric chloride, ferric chloride, hydrofluoric acid, or a chelating agent, is used to remove areas of the copper sheet 12 and the brazing bonded layer 11 (a layer formed by reaction of the brazing material with the copper sheet and the ceramic substrate in the copper sheet bonding) that are not covered with the resist film, thereby forming a predetermined circuit pattern and heat sink pattern.

Next, the circuit pattern and the heat sink pattern may be subjected to a plating process. As the plating step, for example, electroless Ni—P plating or electric Ni plating can be used.

In this manner, a circuit board is obtained.

(4) Effect of the Present Embodiment

According to the present embodiment, one or more of the following effects are achieved.

The bonded substrate 1 of the present embodiment includes the copper sheet 12 having a content of impurity elements S, P, As, Sb, and Zn within a predetermined range and a dislocation density determined by the mWH/WA method of $1.5\times10^{13}$ $m^{-2}$ or less. Such a copper sheet 12 has few dislocations, so that Cu crystals can easily take a slip motion when heated, and work hardening due to thermal deformation can be suppressed. Therefore, for example, when a power module is manufactured by mounting a semiconductor chip on a circuit board obtained from the bonded substrate 1, work hardening of the circuit pattern and the like due to heat load such as furnace processing during a manufacturing process can be suppressed. This makes it possible to suppress an increase in the heat load applied to the ceramic substrate 10, reduce damage accumulated in the ceramic substrate 10 during the manufacturing process, and suppress microcracks occurring in the ceramic substrate 10. In addition, during use, although the power modules are subjected to a heat load caused by the heat cycle such as generating heat when the semiconductor chips are switched on and are cooled when the chips are turned off, damage to the ceramic substrate 10 can also be reduced even in this heat cycle. In this manner, according to the bonded substrate 1 of the present embodiment, damage caused by repeated heat loads can be reduced, and high heat cycle resistance can be achieved.

Further, according to the bonded substrate 1 of the present embodiment, because of its high heat cycle resistance, it is possible to omit providing a stepped or dimpled shape in a metal portion in order to relieve the thermal stress applied to the ceramic substrate of the circuit board. Therefore, it is possible to avoid an increase in an external size of the bonded substrate 1 while ensuring a mounting area for mounting a semiconductor chip on the surface of the circuit board. Further, the manufacturing steps of forming a stepped shape or a dimple shape can be omitted, in which case a manufacturing cost can be reduced.

An average crystal grain size of copper in the copper sheet 12 of the bonded substrate 1 is preferably 0.05 mm to 0.5 mm. By making the average crystal grain size relatively large in this way, work hardening due to heat cycles can be more reliably reduced, and the heat cycle resistance can be further improved.

Further, in producing the bonded substrate 1 of the present embodiment, the raw copper sheet having contents of S, P, As, Sb and Zn within predetermined ranges is used. In this raw copper sheet, the contents of S, P, As, Sb and Zn, which increase the recrystallization temperature of copper, are set within predetermined ranges, thereby suppressing the increase in the recrystallization temperature of copper. Therefore, by heating during bonding, copper can be efficiently recrystallized in the copper sheet 12, and dislocations in the copper sheet 12 can be reduced, making the dislocation density $1.5\times10^{13}$ $m^{-2}$ or less.

Further, in the present embodiment, the ceramic substrate 10 and the raw copper sheet are bonded (brazed) interposing the brazing bonded layer 11. By using brazing, the heating temperature during bonding can be lowered compared to when the ceramic substrate 10 and the raw copper sheet are directly bonded to each other, and the bonding reliability of the copper sheet 12 with the ceramic substrate 10 can be maintained at a high level. Further, in the case of direct bonding, the heating temperature during bonding is relatively high, and the dislocation density tends to be reduced more easily through recrystallization. However, according to the present embodiment, since the raw copper sheet contains a small amount of impurities, recrystallization is easy and the dislocation density can be reduced even when brazing is performed at a relatively low heating temperature. That is, in the bonded substrate 1 of the present embodiment, the dislocation density of the copper sheet 12 can be reduced while increasing the bonding reliability of the copper sheet 12.

Further, in the present embodiment, the ceramic substrate 10 and the raw copper sheet are bonded in an arranged state or in a state where they are temporarily pressed after being arranged. By bonding in this state, a bonding load applied to the copper sheet 12 can be reduced. This makes it possible to suppress deformation of the copper sheet 12 due to the bonding load, and to suppress an increase in the dislocation density caused by the deformation.

Other Embodiments of the Present Invention

The embodiments of the present invention have been specifically described above, but the present invention is not limited to the above-described embodiment, and various modifications can be made without departing from the gist of the present invention.

For example, the above-described embodiment shows the case where the copper sheets 12 are bonded to both surfaces (upper and lower surfaces) of the ceramic substrate 10, but in the copper-ceramic bonded substrate 1, it is sufficient that the copper sheet 12 is bonded to at least one surface of the ceramic substrate 10.

Further, for example, although the mounting area is reduced, in order to further reduce the thermal stress on the ceramic substrate 10 due to the heat load, a stepped shape may be provided in the cross-sectional shape of the copper sheet of the circuit board, or a dimple shape may be provided on the outer periphery of the metal portion.

Further, the above-described embodiment shows the case where the ceramic substrate 10 and the copper sheet 12 are bonded interposing the brazing material, but the present invention is not limited thereto. For example, the ceramic substrate 10 and the copper sheet 12 may be directly bonded to each other. In this case, for example, the ceramic substrate 10 and the copper sheet 12 may be placed in contact with each other without interposing the brazing material, and then heated in an inert gas atmosphere to bond them together. The heating temperature at this time may be, for example, 1065° C. or higher and 1083° C. or lower. Further, the heating time is not particularly limited as long as the bonding reliability between the ceramic substrate 10 and the copper sheet 12 can be ensured.

EXAMPLES

Next, the present invention will be described in more detail based on examples, but the present invention is not limited to these examples.

<Samples 1 to 6>

In this example, a bonded substrate was produced and its heat cycle properties were evaluated.

First, in order to produce the bonded substrate, a ceramic substrate, a raw copper sheet, and a brazing material were prepared.

As the ceramic substrate, an AlN ceramic substrate was prepared. The AlN substrate has dimensions of 68 mm length×68 mm width×0.64 mm thickness, and is provided with dividing lines so that it can be divided into four individual pieces each having dimensions of 34 mm length×34 mm width×0.64 mm thickness.

As the raw copper sheet, an oxygen-free copper sheet (size 68 mm×68 mm×0.25 mm) having a copper purity of 99.96 mass % or more and an alloy number and quality classification of C1020-½H was prepared. In the present example, as shown in Table 1, six types of oxygen-free copper sheets, copper sheet A to copper sheet F, were prepared.

TABLE 1

| | Raw copper sheet | | | | | | | |
|---|---|---|---|---|---|---|---|---|
| | | Impurity element content [ppm] | | | | | | |
| | Type | P | S | Zn | As | Sb | Ag | Total amount of other impurity elements |
| Sample 1 | Copper sheet A | 0.35 | 3.5 | 0.02 | 0.17 | 0.07 | 8.8 | 1.1 |
| Sample 2 | Copper sheet B | 0.96 | 3.4 | 0.02 | 0.16 | 0.07 | 8.7 | 0.9 |
| Sample 3 | Copper sheet C | 1.2 | 5.1 | 0.04 | 0.22 | 0.11 | 9.2 | 6.0 |
| Sample 4 | Copper sheet D | 1.1 | 5.2 | 0.06 | 0.15 | 0.10 | 7.0 | 1.6 |
| Sample 5 | Copper sheet E | 0.09 | 6.6 | 0.05 | 1.1 | 0.38 | 6.2 | 13.0 |
| Sample 6 | Copper sheet F | 0.02 | 7.9 | 0.10 | 2.1 | 1.3 | 6.9 | 8.0 |

In Table 1, the content of impurity elements in each of the copper sheets A to F was measured by glow discharge mass spectrometry (GDMS). Specifically, first, a sample piece of about 25 mm square was cut out from each raw copper sheet. Next, the sample piece was washed with nitric acid to remove surface contamination. The content of impurity elements in the cleaned sample piece was measured using a GDMS measuring device (VG9000 manufactured by VG Elemental). In Table 1, "Total amount of other impurity elements" indicates a total amount including elements other than those listed in the table. The measured values in Table 1 are obtained by a GDMS method, so "other impurity elements" does not include H, C, N, O, group 18 elements, and Ta which is a sample holder for the GDMS measurement device, which cannot be quantitatively evaluated by the GDMS method.

Measurement conditions for the GDMS method were set as follows. A flat cell for a planar sample was used as a discharge cell (ion source), and the discharge cell was cooled with liquid nitrogen during analysis. As a discharge gas, 6N grade high purity Ar gas was used, a glow discharge was in a constant current control mode of 3 mA, and a discharge voltage was controlled to 1 kV by an amount of the discharge gas to be introduced. For detection and measurement of an ion current, a Faraday detector was used for a matrix element Cu, and a Daly detector was used for the other impurity elements. The integration time of the detector was 160 ms acquisition time×1 acquisition number for the Faraday detector, and 200 ms acquisition time×3 to 5 times for the Daly detector. A mass resolution (m/Δm: 5% peak height) was adjusted to about 4000 or more. A built-in value was used for a relative sensitivity factor (RSF) for converting an ion current intensity ratio into a concentration. The ion current value used in the quantitative analysis is measured after surface contamination has disappeared through preliminary discharge (about 20 min) and the ion intensity ratio of each element has become stable.

The brazing material was prepared as follows. 100 parts by mass of powder consisting of 10% by mass of copper powder, 1.7% by mass of titanium powder, 0.5% by mass of titanium oxide powder (titanium (IV) oxide rutile type), with a remainder being silver powder, was weighed, and to 100 parts by mass of these powders, 13.8 parts by mass of a vehicle consisting of an acrylic binder and a solvent was added, and a mixture was kneaded using a mortar and a three-roll mill to produce a paste-like brazing material.

Next, a copper-ceramic bonded substrate was produced using the prepared materials.

Specifically, first, a paste-like brazing material was applied to both sides of an AlN ceramic substrate. At this time, on the AlN ceramic substrate, the paste-like brazing material was screen-printed to a thickness of about 20 μm over substantially an entire surface of each of the four sections separated by parting lines. The AlN ceramic substrate to which the brazing material was applied was dried in the air to form a brazing material coated layer.

Next, copper sheets A to F are stacked on both sides of the AlN ceramic substrate by contacting them with each other interposing the brazing material coated layer, and a weight was placed on the stack interposing a ceramic substrate (alumina substrate) spacer to apply a pressure of 1 kPa to the stack, and in this state, the stack was then introduced into a vacuum furnace. The stack was heated in the vacuum furnace at a bonding temperature (maximum temperature) of 835° C. for 40 minutes and then cooled. In the series of processes of increasing the temperature, maintaining the bonding temperature, and decreasing the temperature, the temperature range of 500° C. or higher continued for 7.5 hours. Further, similarly, in the series of processes of increasing the temperature, maintaining the bonding temperature, and decreasing the temperature, the temperature range of 700° C. or higher continued for 2.5 hours. In this way, copper sheets A to F were bonded to the AlN ceramic substrate, and copper-ceramic bonded substrates were produced as samples 1 to 6.

(Production of a Circuit Board)

Next, a circuit pattern and a heat sink pattern were formed on the copper-ceramic bonded substrate.

Figure 2:
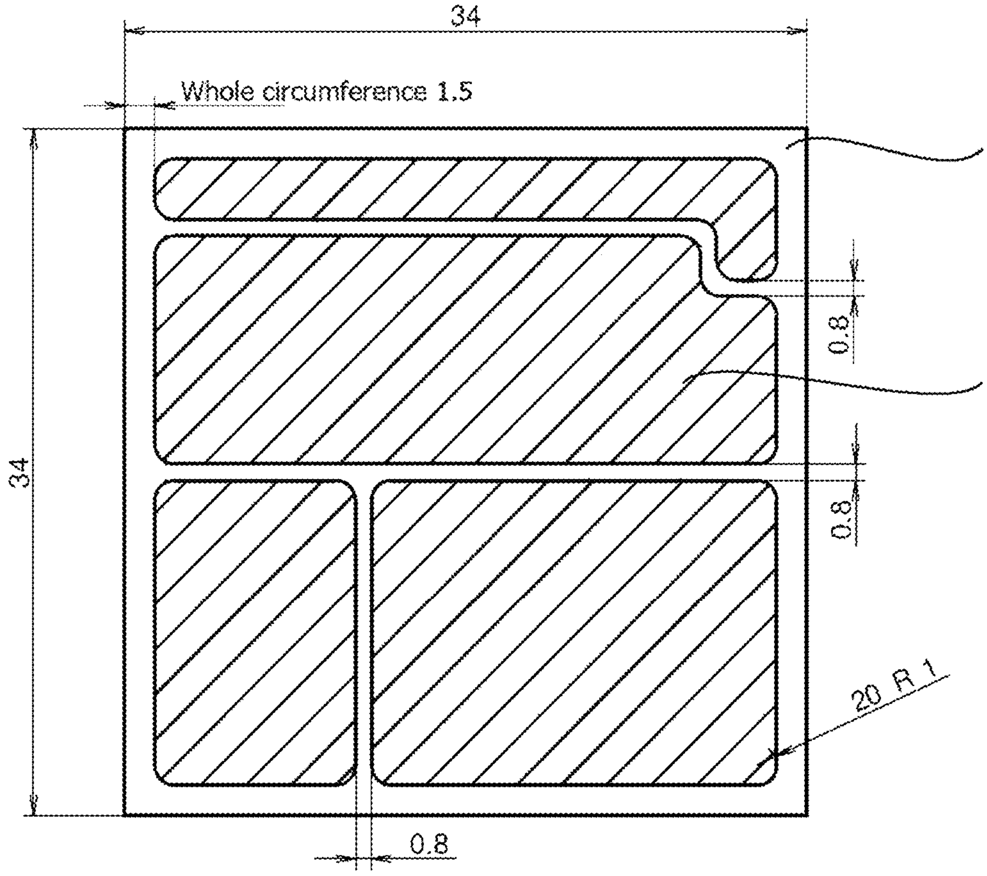
FIG. 2 is a schematic view for explaining a shape of a circuit pattern formed on one surface of the bonded substrate of an example.
Figure 3:
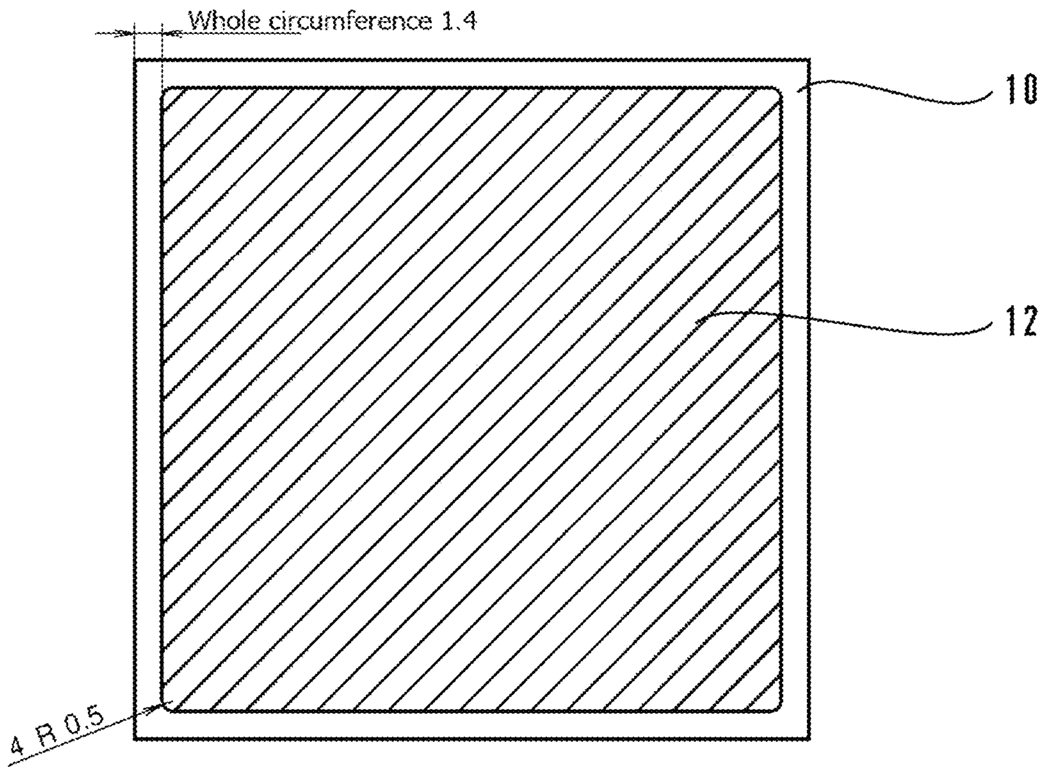
FIG. 3 is a schematic view for explaining a shape of a heat sink pattern formed on an other surface of the bonded substrate of an example.

Specifically, an etching mask having a circuit pattern shape was formed on the surface of the copper sheet on one side of the bonded substrate of samples 1 to 6, and an etching mask having a heat sink pattern shape was formed on the surface of the copper sheet on the other side by applying an ultraviolet-curable alkali-peelable resist ink by a screen printing method and curing it with ultraviolet light. Thereafter, unnecessary parts of the copper sheet and the brazing bonded layer (parts not covered with the etching mask) were removed with a chemical solution, and then the etching mask was removed with an alkaline chemical solution. Then, the stack on which the circuit pattern and the heat sink pattern were formed was divided into four pieces along dividing lines provided on the AlN ceramic substrate. Then, an electroless Ni—P plating film having a plating thickness of 4 μm was formed on the divided stack by electroless Ni—P plating to produce a copper-ceramic bonded substrate (size 34 mm×34 mm). The circuit pattern shape and heat sink pattern shape of this circuit board (metal-ceramic bonded board) are shown in FIG. 2 and FIG. 3. FIG. 2 is a schematic view for explaining the shape of a circuit pattern formed on one surface of the bonded substrate of an example. FIG. 3 is a schematic view for explaining the shape of a heat sink pattern formed on the other surface of the bonded substrate of an example.

(Evaluation Method)

For the circuit boards obtained from the bonded substrates of Samples 1 to 6, an average crystal grain size and dislocation density in the copper sheet, a peel (bonding) strength between the copper sheet and the ceramic substrate, a flexural strength of the circuit board, and a furnace pass durability were measured and evaluated. The peel strength and flexural strength are indicators related to a damage accumulated in the ceramic substrate during the manufacturing step of the bonded substrate (abundance ratio of microcracks in ceramics), and the higher these strengths are, the less damage accumulates in the ceramic substrate of a finally obtained bonded substrate, and the higher the heat cycle resistance of the bonded substrate is. On the other hand, the furnace pass durability is an acceleration test of heat treatment (heat cycle properties) that evaluates the effect of heating when assembling a power module using a circuit board, simulating the case where the circuit board is passed through a furnace during assembly. Each measurement method is explained below.

(Average Crystal Grain Size in the Copper Sheet)

The crystal grain size of the copper sheet was evaluated by an intercept method described in JIS H 0501. Specifically, the evaluation is as follows. First, a copper sheet surface of the bonded substrate was corroded with an etching solution for observing a copper structure to make the crystal grains easier to see, and then an optical microscope image (magnification 100×, field of view size 3.5 mm×2.6 mm) was taken. A line segment (length 3.5 mm) for evaluation of the intercept method was drawn in the center of the obtained image, and the number of crystals cut by the line segment was counted and divided by the cutting length of 3.5 mm, to thereby calculate a particle size in that field. This operation was performed for arbitrary five visual fields, and an average value was taken as an average crystal grain size of the bonded substrate.

(Dislocation Density of the Copper Sheet)

The dislocation density of the copper sheet was measured by X-ray diffraction line profile method (mWH/WA method) for the circuit board (stack) obtained by dividing and before applying electroless Ni—P plating. Specifically, first, in order to remove any surface defects that may have occurred during handling, the divided stacks were subjected to chemical polishing by immersing them for 5 minutes in a chemical polishing solution (45° C.) consisting of 14% by mass of sulfuric acid, 3.2% by mass of hydrogen peroxide, with a remainder being water. Thereby, the surface defect layer formed on the surface of the copper sheet was removed. Then, the dislocation density of the copper sheet was measured for the chemically polished stack by the X-ray diffraction line profile method (mWH/WA method), with a central portion of the copper sheet surface of the heat sink pattern as a measurement point.

The dislocation density was measured using an X-ray diffraction measurement device ("SmartLab" manufactured by Rigaku Corporation). An X-ray source was a Cu tube (tube voltage 45 kV, tube current 200 mA), and X-ray was monochromatized to CuKα rays by an incident-side multilayer mirror. An optical system (arrangement of the X-ray source and detector) was based on a symmetric reflection method (focusing method).

For analysis of the X-ray line profile obtained by the measurement, four peaks of (220), (311), (331), and (420) in a diffraction plane of Cu were used, and the Kα2 component and background were removed by the Ladell method. Further, an influence of line profile broadening caused by a measurement system (caused by a device) was eliminated by measuring a standard sample (a sample of 99.96% pure copper sheet (manufactured by Nilaco Corporation) heated in a vacuum furnace at 750° C. for 6 hours) to determine a line profile change due to the measurement system, and using this to correct an instrument constant by the Stokes method. Further, the value of the constant term Ch00 used in the mWH/WA method was 0.304, which is reported as the value for pure copper.

(Peel Strength)

The peel strength of the circuit board was measured by a 90° peeling method (based on JIS C 5016, crosshead speed 50 mm/min) using a portion of the circuit pattern with a pattern width of 3 mm (a top pattern in FIG. 2). In this example, five pieces of circuit boards were evaluated, and an average value of the measurements at five points was taken as a peel strength.

(Flexural Strength)

A flexural strength was measured by a three-point bending strength measurement (based on JIS C2141, distance between lower supports 30 mm, with a circuit pattern surface placed downward and load applied from above). In this example, five pieces of circuit boards were evaluated, and an average value was taken as a flexural strength.

(Furnace Pass Durability)

A furnace pass durability was evaluated using a batch furnace equipped with an internal carbon hot plate and a water-cooled cooling plate on the underside facing the hot plate that can be raised and lowered to switch between contact and non-contact.

Specifically, the circuit board was placed on a top surface of the hot plate of the batch furnace, and was subjected to a heat load by repeatedly passing through the furnace. The temperature profile for one heat load in the furnace is as follows: the hot plate was heated to a maximum temperature of 380° C. at an average heating rate of approximately 1.0° C./s, with the cooling plate not in contact with the hot plate, and then held at a maximum temperature of 380° C. for 10 minutes. The cooling plate was then brought into contact with the hot plate to rapidly cool to room temperature (an average cooling rate from 380° C. to 100° C. is approximately 2.5° C./s, and an average cooling rate from 100° C. to 40° C. is approximately 0.5° C./s). This process was counted as one cycle. An atmosphere in the batch furnace during the furnace treatment was a reducing atmosphere of hydrogen/nitrogen=20/80 (volume %).

Then, the circuit board is repeatedly subjected to a furnace heat load, and the ceramic substrate of the circuit board is inspected with a microscope every three furnace heat loads, and the number of times when a crack was first found on the ceramic substrate was recorded as a furnace pass durability value of that piece. This furnace pass durability test was performed to 10 pieces of circuit boards, and a Weibull plot analysis was performed to the furnace pass durability test results to estimate the Weibull distribution of the furnace pass durability. An expected value of the Weibull distribution was calculated from the estimated Weibull distribution, and the result was obtained as an expected furnace pass durability value.

Since the circuit board has an electroless Ni—P plating film, it is more likely to induce cracks in the ceramic substrate due to heat load than a state without plating, and the evaluation can be completed with fewer furnace heat load cycles compared to a state without plating.

(Evaluation Results)

Evaluation results are summarized in Table 2.

TABLE 2

| | XRD dislocation density in copper sheet [$m^{-2}$] | | Average grain size of copper sheet | Peel strength | Flexural strength | Furnace pass durability |
|---|---|---|---|---|---|---|
| | Before bonding | After bonding | after bonding [mm] | [N/cm] | [MPa] | [times] |
| Sample 1 | 9.7E+14 | 5.2E+12 | 0.194 | 304 | 435 | 22.3 |
| Sample 2 | 8.7E+14 | 9.7E+12 | 0.165 | 340 | 446 | 18.5 |
| Sample 3 | 1.9E+15 | 9.5E+12 | 0.339 | 310 | 420 | 16.0 |
| Sample 4 | 5.5E+14 | 1.1E+13 | 0.102 | 320 | 453 | 9.6 |
| Sample 5 | 1.7E+15 | 1.1E+13 | 0.091 | 337 | 404 | 8.7 |
| Sample 6 | 6.3E+14 | 2.2E+13 | 0.034 | 236 | 374 | 5.1 |

In samples 1 to 5, copper sheets A to E containing P, S, As, Sb and Zn within a predetermined range were used, and it was confirmed that the dislocation density in the copper sheets could be adjusted to $1.5\times10^{13}$ $m^{-2}$ or less when bonding with a ceramic substrate to create a bonded substrate. Further, the circuit boards produced from the bonded substrates of samples 1 to 5 had peel strengths of 300 N/cm or more and flexural strengths of 400 MPa or more. Therefore, it was confirmed that damage to the ceramic substrate (the occurrence of microcracks) caused by the heat load during the circuit board production process can be suppressed. Further, since the furnace pass durability was 8 or more times, it was confirmed that damage to the ceramic substrate could be suppressed even when the heat load was repeatedly applied to the circuit board. Particularly, it was found that samples 1 to 3, which had a furnace pass durability of 15 times or more, were superior among the samples of the present invention.

In contrast, in sample 6, since copper sheet F containing more than the prescribed amounts of S, As, Sb, and Zn was used, it was confirmed that the dislocation density in the copper sheet of the bonded substrate was as large as $2.2\times10^{13}$ $m^{-2}$. This is presumably because there are many S, As, Sb, and Zn, which increase the recrystallization temperature, and little P, which suppresses the increase in recrystallization temperature due to S, so Cu cannot be efficiently recrystallized during bonding and dislocations cannot be reduced. Further, it was confirmed that Sample 6 had smaller peel strength and flexural strength than Samples 1 to 5. From this fact, it is considered that the copper sheet became work-hardened during the production process of the circuit board, which increased the heat stress applied to the ceramic substrate, causing damage to the ceramic substrate. It was also confirmed that the ceramic substrate had a low furnace pass durability and was easily damaged by repeated heat loads being applied to the circuit board.

As described above, in the bonded substrate, by using the copper sheet having P, S, As, Sb, and Zn contents within a predetermined range, the dislocation density in the copper sheet can be reduced by heating when bonding to the ceramic substrate, and high heat cycle performance can be achieved.

DESCRIPTION OF SIGNS AND NUMERALS

1. Copper-ceramic bonded substrate
10. Ceramic substrate
11. Brazing bonded layer
12. Copper sheet

The invention claimed is:

1. A copper-ceramic bonded substrate, comprising:
a ceramic substrate; and
a copper sheet which has been bonded to at least one surface of the ceramic substrate, wherein a dislocation density measured by the modified Williamson-Hall/Warren-Averbach method on the surface of the copper sheet which has been bonded to at least one surface of the ceramic substrate is $1.5\times10^{13}$ $m^{-2}$ or less.

2. The copper-ceramic bonded substrate according to claim 1,
wherein the copper sheet has an arsenic content of 0.005 ppm to 1.5 ppm and an antimony content of 0.005 ppm to 0.5 ppm.

3. The copper-ceramic bonded substrate according to claim 1,
wherein the copper sheet has a sulfur content of 0.1 ppm to 7 ppm and a phosphorus content of 0.05 to 2 ppm.

4. The copper-ceramic bonded substrate according to claim 1,
wherein a zinc content in the copper sheet is 0.005 ppm to 0.08 ppm.

5. The copper-ceramic bonded substrate according to claim 1,
wherein a silver content in the copper sheet is 0.1 ppm to 20 ppm.

6. The copper-ceramic bonded substrate according to claim 1,
wherein a total amount of impurity elements in the copper sheet, excluding sulfur, phosphorus, arsenic, antimony, zinc and silver, is 0.01 ppm to 15 ppm.

7. The copper-ceramic bonded substrate according to claim 1,
wherein a material of the copper sheet is an oxygen-free copper or a tough pitch copper.

8. The copper-ceramic bonded substrate according to claim 1,
wherein a brazing bonded layer is provided between the ceramic substrate and the copper sheet, and the copper sheet is bonded to the ceramic substrate interposing the brazing bonded layer.

9. The copper-ceramic bonded substrate according to claim 2,
wherein the copper sheet has a sulfur content of 0.1 ppm to 7 ppm and a phosphorus content of 0.05 to 2 ppm.

* * * * *